US007579830B2

(12) United States Patent
Roney et al.

(10) Patent No.: US 7,579,830 B2
(45) Date of Patent: Aug. 25, 2009

(54) APPARATUS AND METHODS FOR INSPECTING COOLING SLOT DEFECTS IN TURBINE ROTOR WHEELS

(75) Inventors: Robert M. Roney, Schoharie, NY (US); Paul C. Bagley, Middleburgh, NY (US); Richard Hatley, Convent Station, NJ (US)

(73) Assignee: General Electric Company, Schenectady, NY (US)

( * ) Notice: Subject to any disclaimer, the term of this patent is extended or adjusted under 35 U.S.C. 154(b) by 589 days.

(21) Appl. No.: 11/149,547

(22) Filed: Jun. 10, 2005

(65) Prior Publication Data

US 2006/0280604 A1 Dec. 14, 2006

(51) Int. Cl.
*G01N 27/82* (2006.01)
*G01N 27/90* (2006.01)

(52) U.S. Cl. ....................................... 324/238; 324/228

(58) Field of Classification Search ................. 324/228, 324/238–242, 219–221, 234, 260–262; 73/866.5
See application file for complete search history.

(56) References Cited

U.S. PATENT DOCUMENTS 4,706,020 A * 11/1987 Viertl et al. ................. 324/238
6,426,622 B1 * 7/2002 Givens et al. ............... 324/262
6,477,773 B1 * 11/2002 Wilson et al. .............. 29/889.1
6,545,467 B1 * 4/2003 Batzinger et al. ........... 324/219
6,608,478 B1 * 8/2003 Dziech et al. ............... 324/262
6,952,094 B1 * 10/2005 Viertl ......................... 324/238

* cited by examiner

*Primary Examiner*—Bot LeDynh
(74) *Attorney, Agent, or Firm*—Nixon & Vanderhye, P.C.

(57) ABSTRACT

A probe is pulled along a cooling slot of a turbine wheel to detect defects along the slot surfaces. The cooling slot extends radially inwardly of the bases of both the dovetails and dovetail slots. A housing assembly is releasably coupled to the rim of the turbine wheel and a motor draws the probe along the cooling slot at constant speed. A guide and brushes on the probe serve to bias the probe radially outwardly against the surfaces to be inspected as the probe is drawn along the cooling slot.

17 Claims, 4 Drawing Sheets

APPARATUS AND METHODS FOR INSPECTING COOLING SLOT DEFECTS IN TURBINE ROTOR WHEELS

TECHNICAL BACKGROUND

The present invention relates to apparatus and methods for inspecting the surface of cooling slots in turbine rotor wheels for defects and particularly relates to apparatus and methods for displacing an eddy current probe at constant speed along the cooling slot to optimize data collection.

BACKGROUND OF THE INVENTION

Rotor wheels, for example for gas turbines, typically include a plurality of circumferentially spaced dovetails about the periphery of the rotor wheel defining dovetail slots therebetween. The dovetail slots receive corresponding dovetail shaped bases of buckets which carry the plurality of airfoils about the rotor wheel. The buckets or airfoils are often cooled by air entering through a cooling slot in the rotor wheel and through grooves or slots formed in the bases of the buckets. Typically, the cooling slot extends circumferentially 360° through the dovetails in the dovetail slots. Eddy current inspection of the cooling slot may be used to identify cooling slot surface defects. It has been discovered however that when pulling an eddy current probe along the slot, e.g. manually, the variability of the speed of movement of the probe along the slot affects the sensed data. When the data is analyzed, the detection of cracks along the cooling slot surface and their location become much more difficult to ascertain. Accordingly, there has developed a need for apparatus and methods for accurately and consistently sensing cooling slot surface defects in the cooling slot of a turbine rotor wheel.

BRIEF DESCRIPTION OF THE INVENTION

In a preferred embodiment of the present invention, there is provided a method for inspecting a surface of a cooling slot about a turbine rotor wheel having a plurality of circumferentially spaced dovetails defining dovetail slots therebetween, the cooling slot extending circumferentially about the dovetails and the dovetail slots, comprising the steps of: disposing an eddy current probe in the cooling slot; and moving the eddy current probe along the cooling slot at a constant speed to detect cooling slot surface defects.

In another preferred embodiment of the present invention, there is provided apparatus for inspecting a surface of a cooling slot about a turbine rotor wheel having a plurality of circumferentially spaced dovetails defining dovetail slots therebetween, comprising: an eddy current probe for disposition within the cooling slot; a mounting assembly including an electric motor and a plug for disposition within a dovetail slot for supporting the electric motor outwardly of the cooling slot; a lead between said probe and said electric motor for disposition along the cooling slot, said electric motor enabling the lead and the probe to be pulled along the cooling slot.

DETAILED DESCRIPTION OF THE INVENTION

Figure 1:
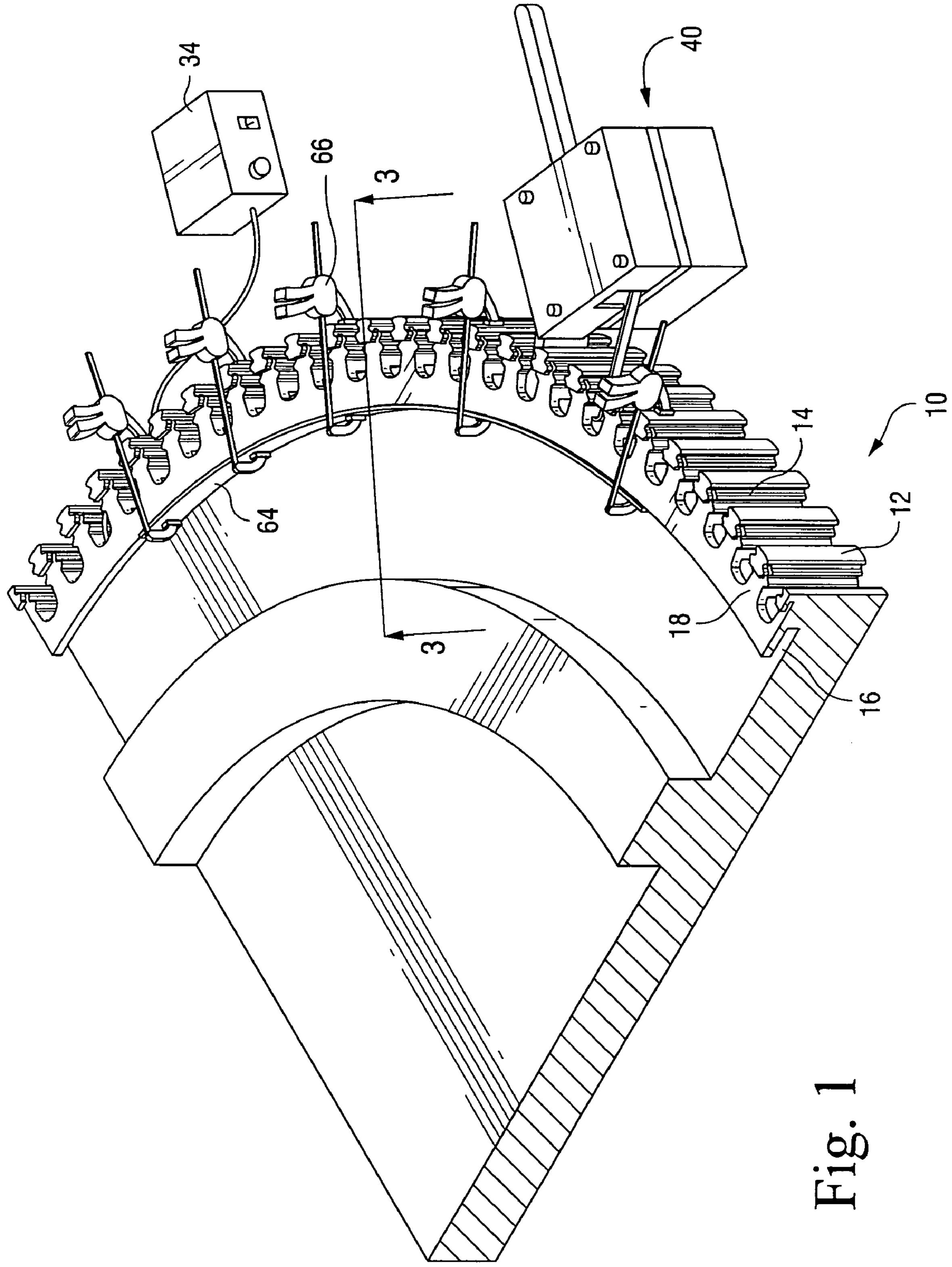
FIG. 1 is a perspective view of a portion of a turbine rotor wheel illustrating the dovetails and dovetail slots and apparatus and methods utilizing an eddy current probe for accurately and consistently determining cooling slot surface defects in accordance with a preferred embodiment of the present invention.

Referring to the drawings, particularly to FIG. 1, there is illustrated a portion of a rotor wheel generally designated 10 for a gas turbine. The rim of rotor wheel 10 includes a plurality of dovetails 12 circumferentially spaced one from the other and defining dovetail slots 14 between adjacent dovetails 12. The dovetails 12 each have a groove/rib configuration along opposite side walls as is conventional. The dovetail slots 14 receive generally correspondingly shaped dovetails of buckets, not shown. The buckets thus form a circumferential array of airfoils about the rotor wheel 10. The dovetail slots 14 as illustrated are typically termed "axial entry" slots whereby the dovetails of the buckets are received in the slots 14 in a generally axial direction.

Figure 2:
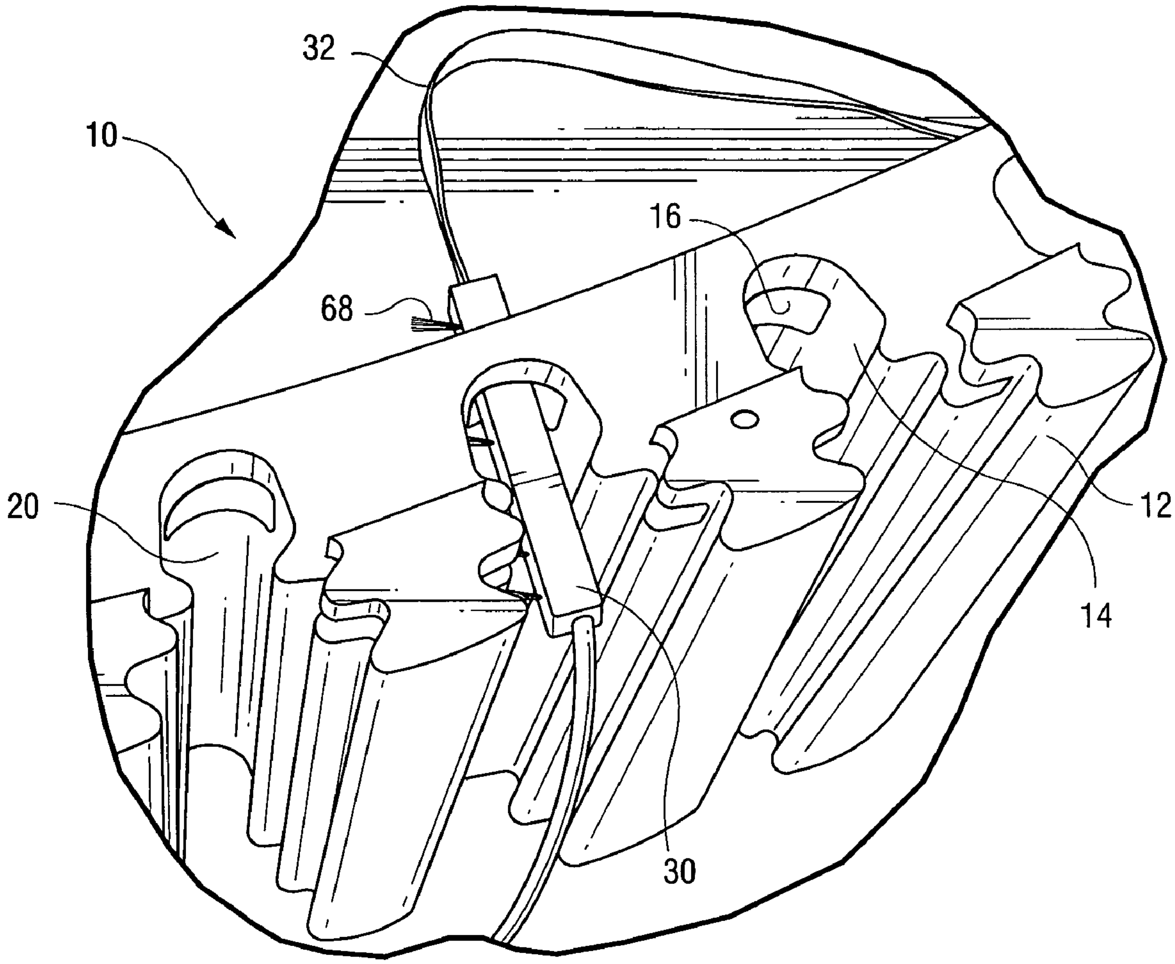
FIG. 2 is an enlarged fragmentary perspective view illustrating insertion of an eddy current probe through a dovetail slot for reception into the cooling slot.

Referring to FIGS. 1 and 2, the forward or upstream axial face of the rotor wheel 10 is provided with a cooling slot 16 along undersides of the dovetails adjacent the upstream axial face of the wheel. The cooling slot 16 extends circumferentially about wheel 10 a full 360° and passes through the base 18 of each dovetail 12 and through the base of each dovetail slot 14. It will be appreciated that when the buckets are installed on the rotor wheel, cooling air, for example compressor discharge air, is supplied to the cooling slot 16 which in turn supplies cooling air into the base portion 20 (FIG. 2) of the dovetail slots 14 for transmittal through grooves or slots, not shown, opening through the base of the bucket for cooling the interior of the bucket airfoil. It is important that the surfaces of the cooling slot 16, particularly the outer surfaces of cooling slot 16 and the transition between the radial outer surfaces and the side walls of the slot be free of defects. e.g. cracking and pitting. To insure that the surface defects if extant on these surfaces are identified, eddy current testing of the cooling slot is performed.

Generally, an eddy current probe, e.g. probe 30 is displaced along the cooling slot 16 and collects data reflecting surface defects in the cooling slot. It has been discovered, however, that variations in the speed of the probe passing along the cooling slot affects data collection to the extent that the data becomes shifted and distorted rendering it more difficult to accurately detect and locate surface defects. By moving the probe along the cooling slot at a constant speed, however, and in accordance with a preferred aspect of the present invention, the data collected produces substantially clearer and more accurate results. Also the test results are more consistent between different operators and reduces the human error which could lead to poor inspection results.

The present invention provides a system for moving an eddy current probe along the cooling slot 16 of the turbine wheel at a constant speed. To accomplish this, the probe 30 has a lead 32 attached to the probe at one end for drawing the probe along the cooling slot 16. The opposite end of the probe 30 is coupled to a data collection system 34 for collecting data generated by the probe. The opposite end of the lead 32 is coupled to a mounting assembly generally designated 40 including an electric motor 42 (FIG. 4).

Figure 5:
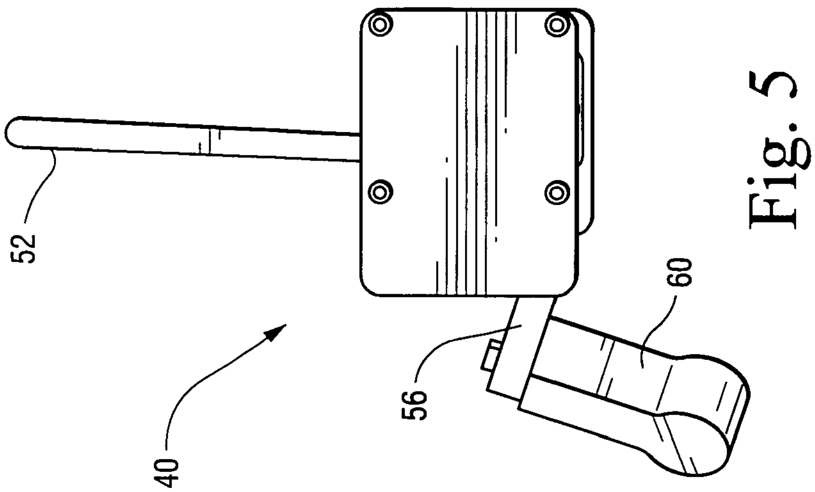
FIG. 5 is an end elevational view of the probe puller in an assembled condition.
Figure 4:
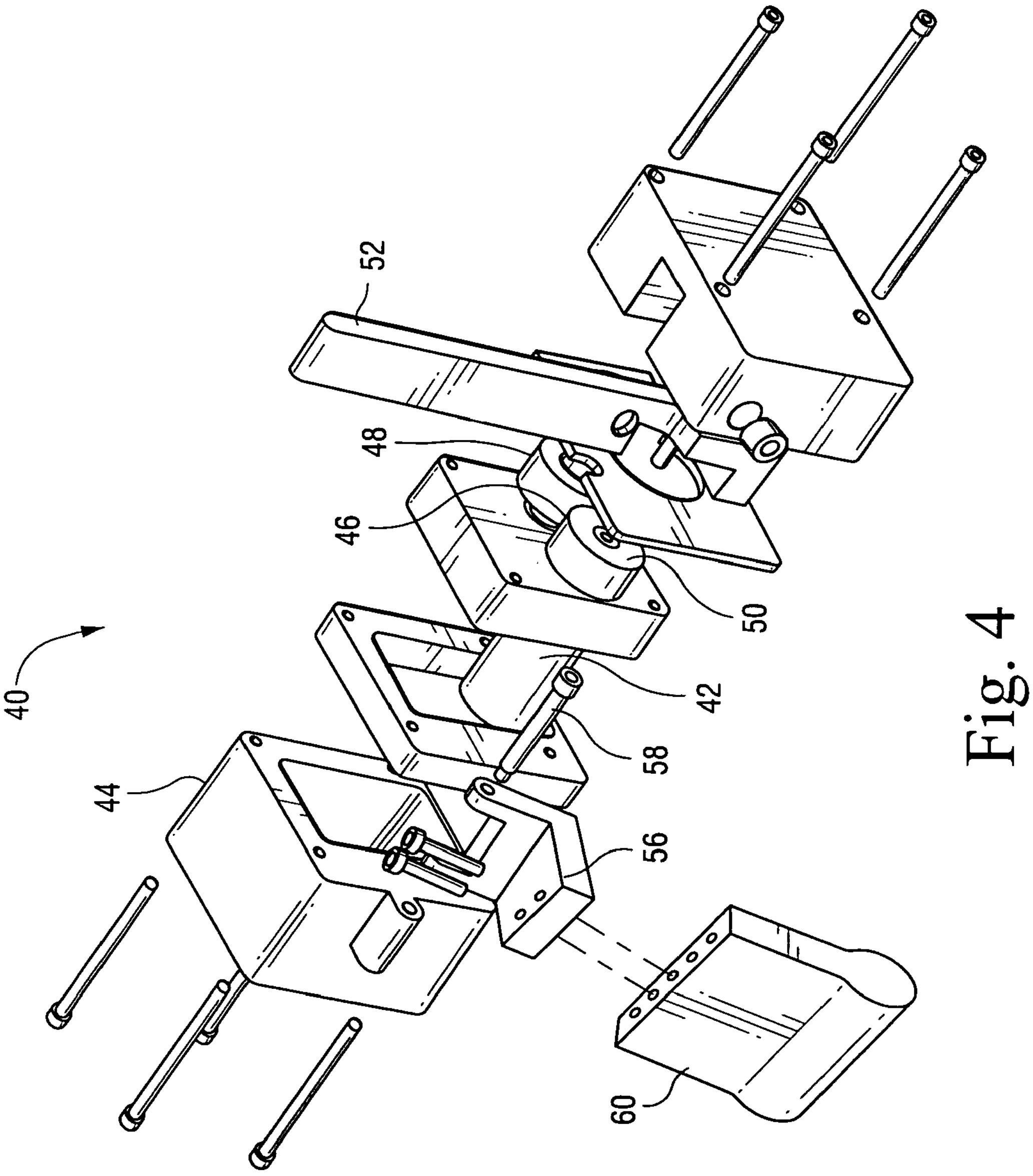
FIG. 4 is an exploded perspective view of an eddy current probe puller for drawing the eddy current probe along the cooling slot.

Referring to FIGS. 4 and 5, mounting assembly 40 includes a housing 44 which, in assembled condition, includes a slot opening through one side of the housing 44 and into the nip 46 between a drive wheel 48 and an idler wheel 50 carried within the mounting assembly. The drive wheel 48 is coupled to the electric motor 42 and the lead 32 extends between the drive and idler rollers 48 and 50 whereby upon actuation of the motor, the lead 32 may be taken up or drawn through the assembly. A spring biased release lever 52 is provided to separate the wheels 48 and 50 one from the other to enable the lead 32 to be threaded between the wheels. The opposite side of the housing 44 is also open such that portions of the lead 32 beyond the wheels can play out.

The mounting assembly 40 also includes a pivot block 56 pivotally mounted to the assembly on a pivot pin 58. The pivot block 56 carries a slot plug 60 which has a distal shape generally corresponding to the base of a dovetail slot 14. It will be appreciated that by mounting the slot plug 60 in one of the dovetail slots 14 the wheels 48 and 50 of the motor assembly can be aligned radially with the cooling slot 16.

To pull the probe 30 along the cooling slot 16 at a constant speed, the lead 32 is threaded into the cooling slot 16 through a dovetail slot 14 adjacent the area of inspection. The lead 32 is then threaded along the cooling slot 16 passing along or below a certain number, for example ten, dovetails 12 and a similar number of dovetail slots 14. The lead 32 is then threaded radially outwardly into and through a dovetail slot 14 for threading between the wheels 48 and 50. The assembly 40 is mounted to the wheel 10 by inserting the slot plug 60 into an adjacent dovetail slot 14. The positioning of the slot plug 60 enables alignment of the assembly to the cooling slot and supplies stationary support for the pulling mechanism within the assembly.

Figure 3:
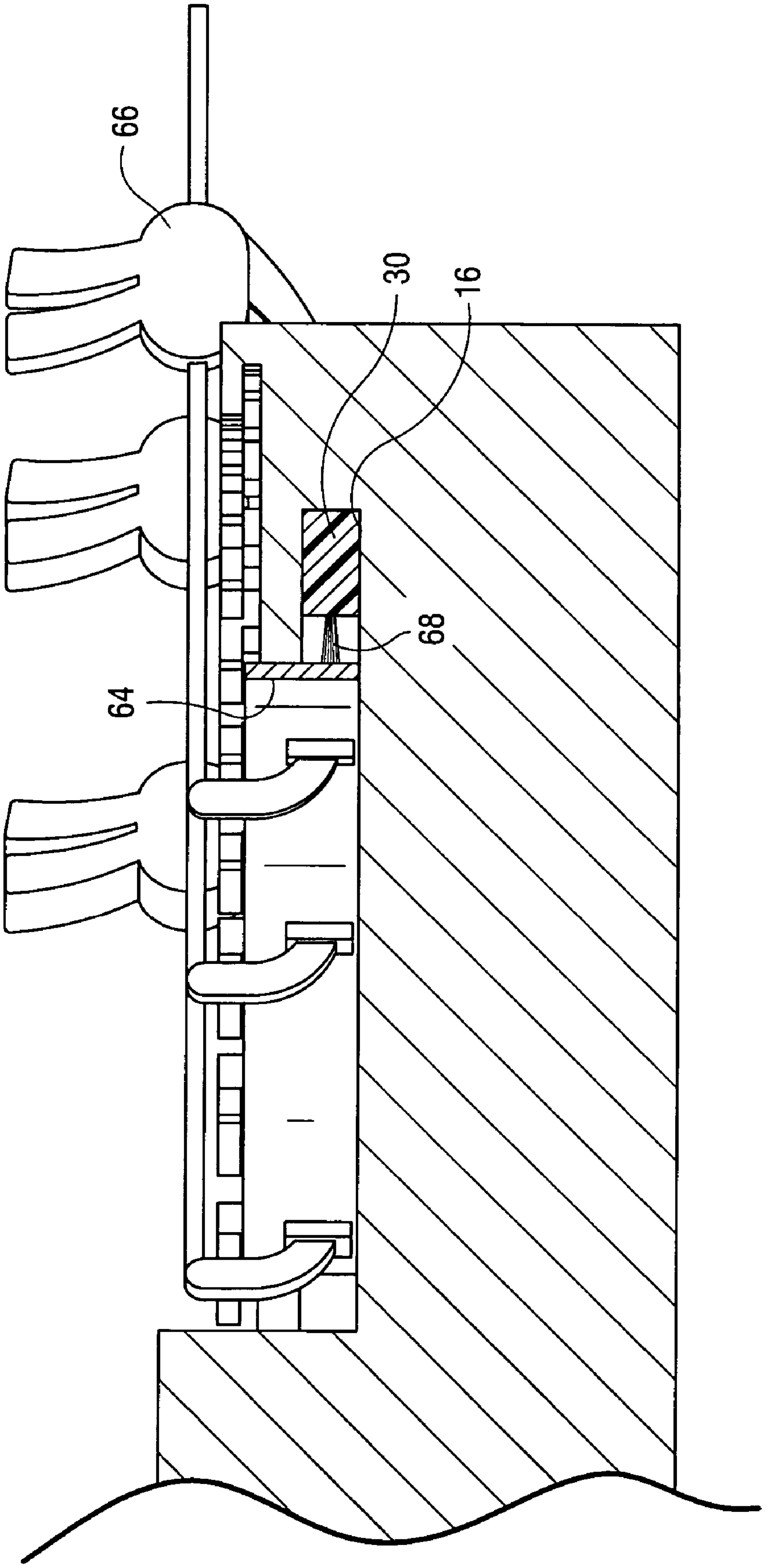
FIG. 3 is a cross-sectional thereof taken generally about on line 3-3 in FIG. 1.

Additionally and as illustrated in FIGS. 1 and 3, the cooling slot 16 is closed along its radial inner side throughout the extent of the surface of the cooling slot to be inspected. To accomplish this and for an unassembled wheel, a guide 64, e.g. a strip of spring steel, is aligned with the radial inward opening of the cooling slot. The guide 64 is restrained against the inner rim of the wheel by a plurality of clamps 66, for example C-shaped clamps. When the wheel 10 is assembled in the turbine, a similar guide is placed through a gap between the wheel and the adjoining spacer and clamps 64 are not used. It will be appreciated that the lead 32 is thus captured in the cooling slot 16 between the surfaces to be inspected and the guide 64 when the wheel is unassembled or a similar guide when the wheel is assembled in the rotor. Also as illustrated in FIGS. 2 and 3, the probe 30 includes a plurality of brushes 68 at longitudinally spaced positions along the probe and which brushes 68 project radially inwardly to bear against the guide 64. Consequently, the probe 30 is biased in a radial outward direction against the surfaces of the cooling slot 16 to be inspected.

The motor 42 in the motor housing assembly 40 is a variable speed motor which can be operated at a variety of constant speeds. Consequently, when the motor is set to drive the wheels at a constant speed, the lead 32 draws the probe 30 along the cooling slot 16 at a constant speed. By drawing the probe through the cooling slot 16 at a constant speed, clearer data results are achieved for enhanced detection and accurate location of defects along the cooling slot.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for inspecting a surface of a cooling slot about a turbine rotor wheel having a plurality of circumferentially spaced dovetails defining dovetail slots therebetween, the cooling slot extending circumferentially about the dovetails and the dovetail slots, comprising the steps of:

disposing an eddy current probe in the cooling slot; and moving the eddy current probe along the cooling slot at a constant speed to detect cooling slot surface defects.

2. A method according to claim 1 including providing a lead on the probe and drawing the lead and probe through the cooling slot.

3. A method according to claim 1 including initially disposing the eddy current probe in the cooling slot by passing the probe through a first dovetail slot.

4. A method according to claim 3 including providing a lead on the probe, disposing a portion of the lead remote from the probe through a second dovetail slot spaced from the first cooling slot and drawing the lead and the probe along the cooling slot between the first and second dovetail slots.

5. A method according to claim 1 including biasing the probe for following movement along an arcuate path within the cooling slot.

6. A method according to claim 1 wherein the cooling slot opens radially inwardly of the wheel and applying a guide to the wheel to close the radially inward cooling slot opening to guide the probe along the cooling slot.

7. A method according to claim 1 including providing a lead on the probe and providing an electric motor for drawing the lead and probe along the cooling slot.

8. A method according to claim 1 including initially disposing the eddy current probe in the cooling slot by passing the probe through a first dovetail slot providing a lead on the probe, disposing a portion of the lead remote from the probe through a second dovetail slot spaced from the first dovetail slot, providing an electric motor for drawing the lead and the probe along the cooling slot between the first and second dovetail slots by operating the motor at a constant speed.

9. A method according to claim 8 including attaching the electric motor to the rotor wheel.

10. A method according to claim 9 including inserting a guide carrying the electric motor into a third dovetail slot to support the motor while the lead and probe are moved along the cooling slot.

11. A method according to claim 10 including providing a pair of wheels in a housing, at least one of the wheels being driven by the electric motor, and pivoting the housing and guide relative to one another to align the wheels to receive the lead.

12. Apparatus for inspecting a surface of a cooling slot about a turbine rotor wheel having a plurality of circumferentially spaced dovetails defining dovetail slots therebetween, comprising:

an eddy current probe for disposition within the cooling slot;

a mounting assembly including an electric motor and a plug for disposition within a dovetail slot for supporting the electric motor outwardly of the cooling slot;

a lead between said probe and said electric motor for disposition along the cooling slot, said electric motor enabling the lead and the probe to be pulled along the cooling slot.

13. Apparatus according to claim 12 wherein said plug is shaped in part complementary to a portion of a dovetail slot to retain the guide in the dovetail slot and support the electric motor.

14. Apparatus according to claim 12 including a guide for closing the cooling slot along a radially inward opening thereof.

15. Apparatus according to claim 14 including clamps for releasably securing the guide to the wheel.

16. Apparatus according to claim 12 wherein said mounting assembly includes a wheel driven by said motor and an adjacent wheel forming a nip therebetween, said lead be threaded through said nip and between said wheels enabling the motor to pull the lead through the wheels.

17. Apparatus according to claim 16 wherein the mounting assembly includes a housing for the electric motor and the wheels, said plug being pivotally connected to said housing.

* * * * *